United States Patent
Onishi et al.

(10) Patent No.: US 9,972,958 B2
(45) Date of Patent: May 15, 2018

(54) PRESS-FITTING DEVICE

(71) Applicant: J.S.T. Mfg. Co., Ltd., Osaka-shi (JP)

(72) Inventors: Junji Onishi, Miyoshi (JP); Masataka Nishiura, Miyoshi (JP)

(73) Assignee: J.S.T. MFG. CO., LTD., Osaka-shi (JP)

( * ) Notice: Subject to any disclaimer, the term of this patent is extended or adjusted under 35 U.S.C. 154(b) by 293 days.

(21) Appl. No.: 14/647,629

(22) PCT Filed: Nov. 27, 2013

(86) PCT No.: PCT/JP2013/081871
§ 371 (c)(1),
(2) Date: May 27, 2015

(87) PCT Pub. No.: WO2014/084241
PCT Pub. Date: Jun. 5, 2014

(65) Prior Publication Data
US 2015/0311661 A1    Oct. 29, 2015

(30) Foreign Application Priority Data

Nov. 30, 2012    (JP) ................................ 2012-262264

(51) Int. Cl.
*H01R 43/20*    (2006.01)
*H01R 43/055*   (2006.01)
(Continued)

(52) U.S. Cl.
CPC ......... *H01R 43/205* (2013.01); *H01R 12/585* (2013.01); *H01R 43/0488* (2013.01);
(Continued)

(58) Field of Classification Search
CPC .............. H01R 12/585; H01R 43/0488; H01R 43/055; H01R 43/16; H01R 43/20;
(Continued)

(56) References Cited

U.S. PATENT DOCUMENTS 4,025,999 A * 5/1977 Wolyn .............. Y10T 29/53235
29/753
4,176,448 A 12/1979 Zahn et al.
(Continued)

FOREIGN PATENT DOCUMENTS

CN    1438835 A    8/2003
CN    101444151 A  5/2009
(Continued)

OTHER PUBLICATIONS

Extended European Search Report dated Jun. 10, 2016 issued with respect to the corresponding European Patent Application No. 13858234.1.
(Continued)

*Primary Examiner* — A. Dexter Tugbang
(74) *Attorney, Agent, or Firm* — Kratz, Quintos & Hanson LLP

(57) ABSTRACT

The press-fitting device has: a base; a rear surface plate; and a vertical operation section and mounts PF terminals having a shoulder section and a PF section to the member to be mounted. Provided on the vertical operation section are: an insertion path wherein a continuous PF terminal body formed by consecutive PF terminals is inserted; a movable feeding means that feeds the continuous PF terminal body along; a dividing means that divides the continuous PF terminal body into individual PF terminals; and a mounting means that mounts the PF terminals to the mounting member. A fixed feeding means is fixed to the rear surface plate in a static state relative to the vertical operation section, and restricts continuous PF terminal body movement that is in conjunction with the vertical operation section. The PF terminals are mounted to the mounting member by the vertical movement of the vertical operation section.

5 Claims, 9 Drawing Sheets

(51) Int. Cl.
*H01R 12/58* (2011.01)
*H01R 43/048* (2006.01)
*H01R 43/16* (2006.01)
*B23P 19/04* (2006.01)
*B23P 19/10* (2006.01)

(52) U.S. Cl.
CPC ............ *H01R 43/055* (2013.01); *H01R 43/16* (2013.01); *H01R 43/20* (2013.01); *B23P 19/04* (2013.01); *B23P 19/10* (2013.01); *Y10T 29/49121* (2015.01); *Y10T 29/49218* (2015.01); *Y10T 29/53209* (2015.01); *Y10T 29/53235* (2015.01); *Y10T 29/53243* (2015.01)

(58) Field of Classification Search
CPC ........ H01R 43/205; B23P 19/04; B23P 19/10; Y10T 29/49121; Y10T 29/49218; Y10T 29/53209; Y10T 29/53235; Y10T 29/53243
See application file for complete search history.

(56) References Cited

U.S. PATENT DOCUMENTS

| | | | |
|---|---|---|---|
| 4,318,964 | A | 3/1982 | Zahn et al. |
| 4,590,659 | A | 5/1986 | Yagi et al. |
| 5,095,609 | A * | 3/1992 | Correll, Jr. ............. H01R 43/16 29/564.2 |
| 5,855,294 | A | 1/1999 | Karrasch et al. |
| 6,405,915 | B1 | 6/2002 | Backenstoes et al. |
| 2003/0135991 | A1 | 7/2003 | Nagao et al. |
| 2009/0241325 | A1 | 10/2009 | Mukai |
| 2010/0284769 | A1 | 11/2010 | Fritschy et al. |

FOREIGN PATENT DOCUMENTS

| | | |
|---|---|---|
| JP | S53-109284 A | 9/1978 |
| JP | H02-151333 | 6/1990 |
| JP | H07-111181 | 4/1995 |
| JP | 2689001 B2 | 12/1997 |
| JP | 2005-71729 A1 | 3/2005 |
| JP | 2005141965 A * | 6/2005 |
| JP | 2008-282741 A1 | 11/2008 |
| JP | 2009-233695 A1 | 10/2009 |
| JP | 2010-198767 A | 9/2010 |
| WO | 2010/095287 A1 | 8/2010 |

OTHER PUBLICATIONS

International Search Report for International Application No. PCT/JP2013/081871 dated Jan. 14, 2014.
Chinese Patent Application No. 201380062459.8: Office Action dated Apr. 1, 2017.
Japanese Patent Application No. 2014-549851: Office Action dated Jul. 26, 2017.

* cited by examiner

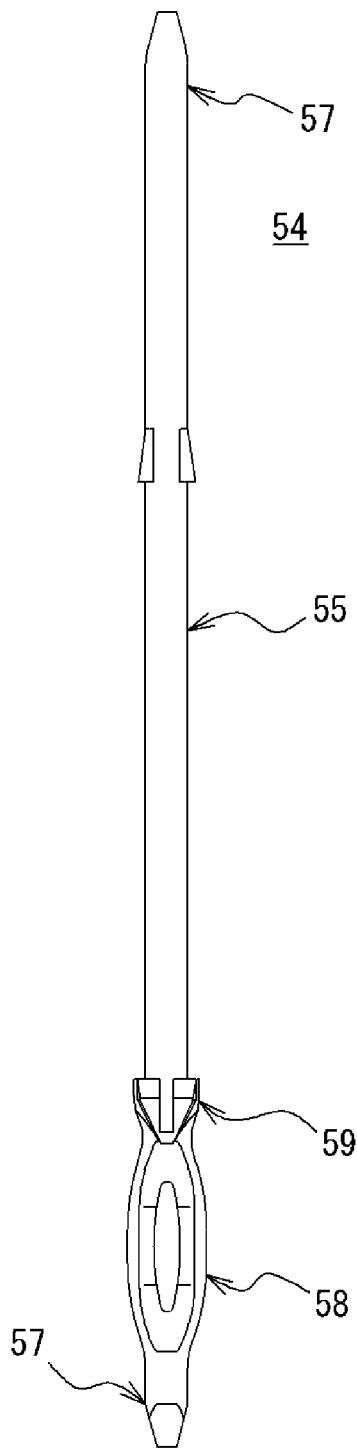
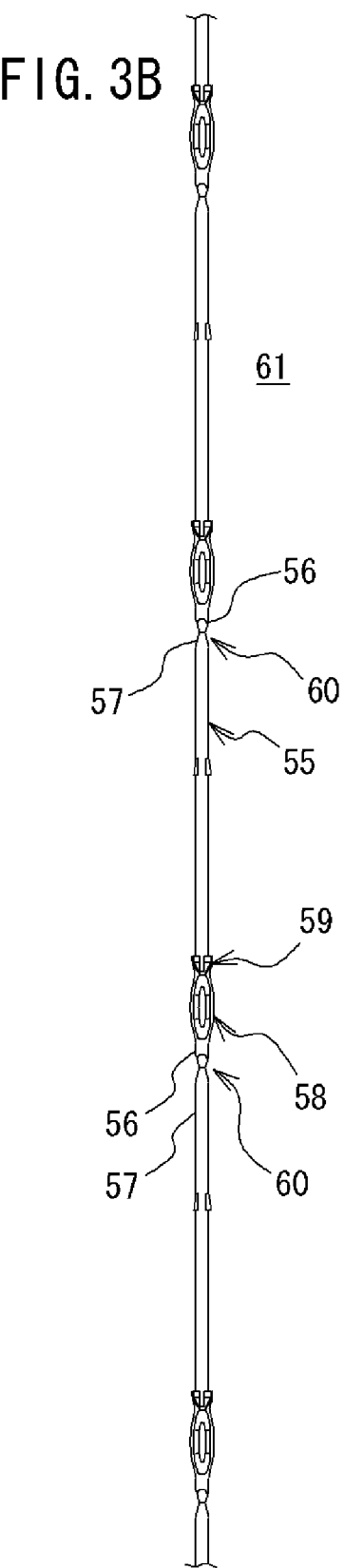

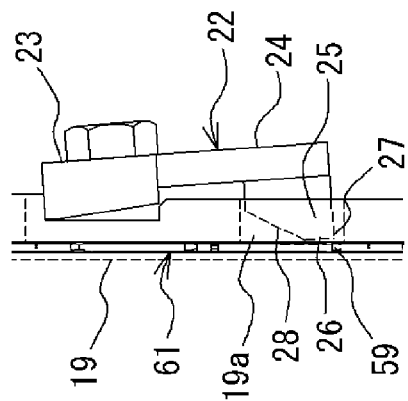
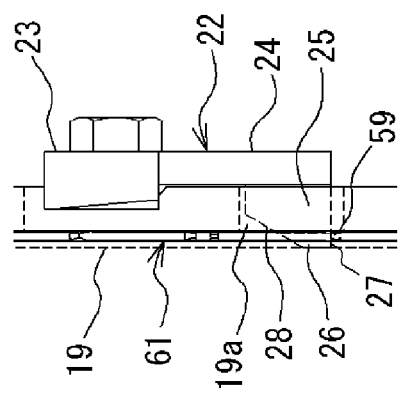
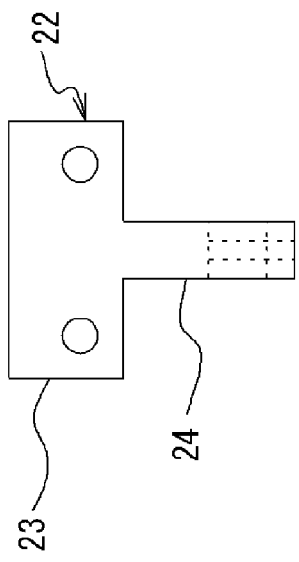
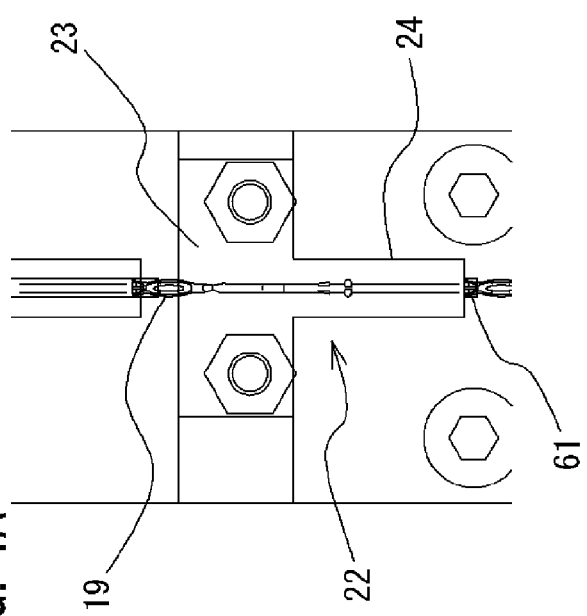

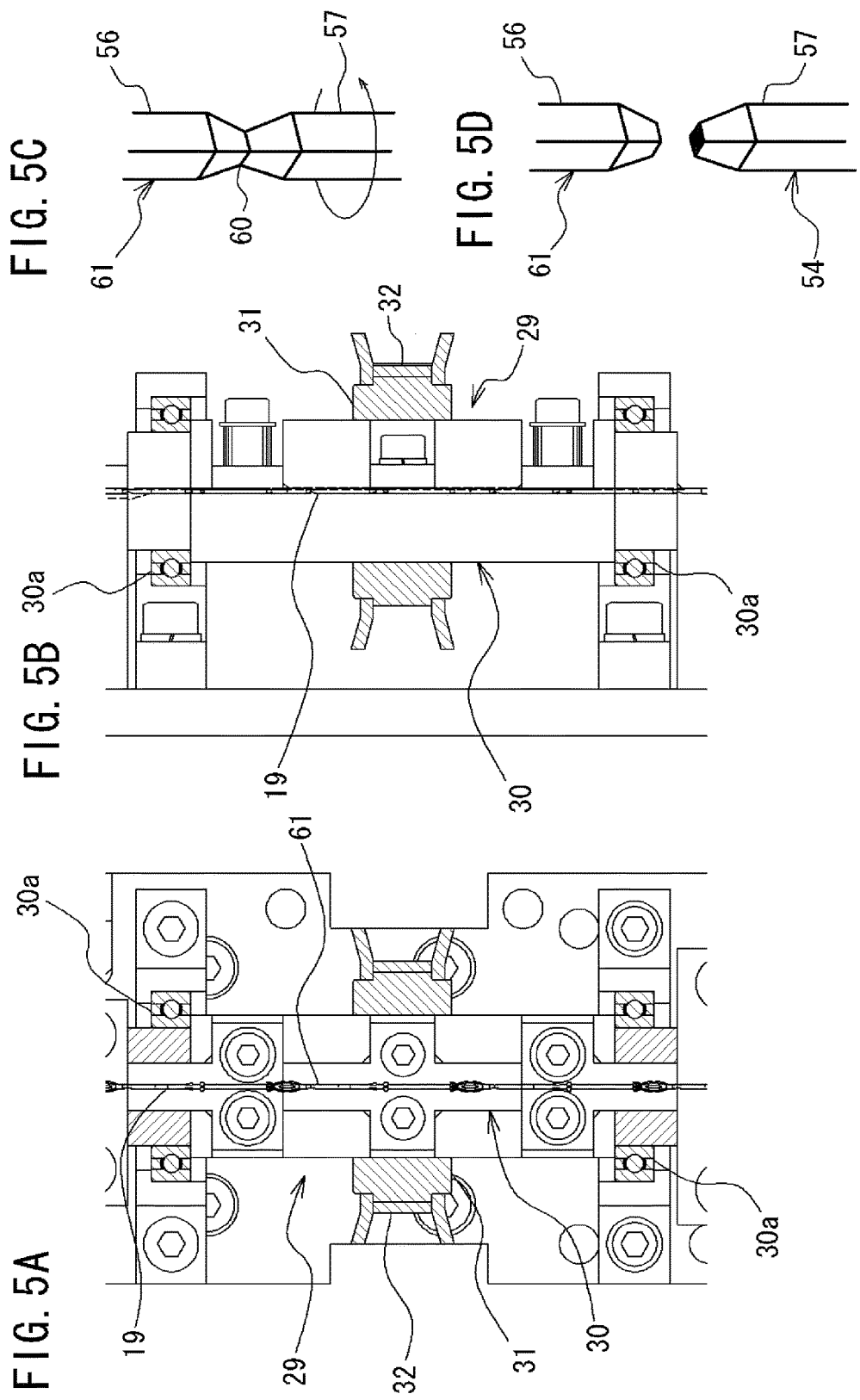

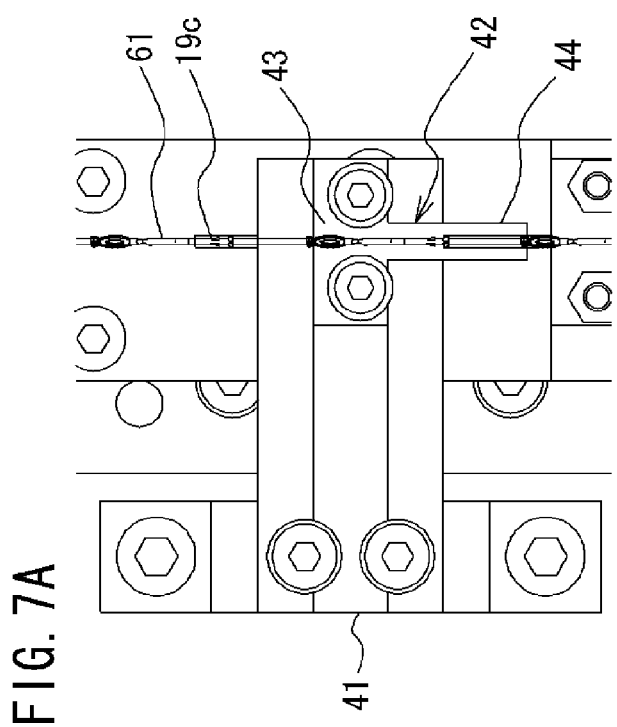
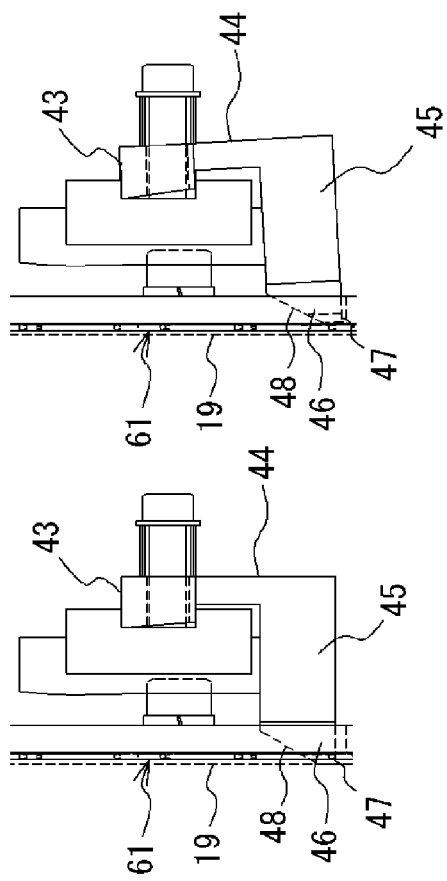
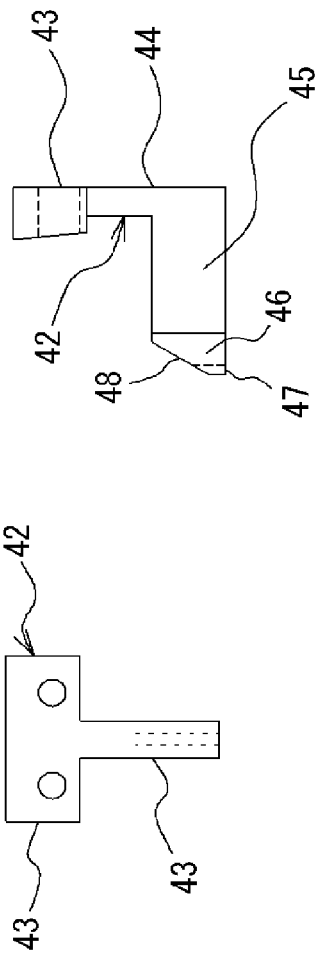

PRESS-FITTING DEVICE

TECHNICAL FIELD

This invention relates to a press-fitting device being capable of continuously performing a series of processes for mounting a continuous press-fit terminal body in which press-fit terminals having shoulders are continuously formed in a wire rod by being divided into press-fit terminals and being press-fitted to a mounting member such as a substrate.

BACKGROUND ART

Contacts and terminals have been mounted to a mounting member by making use of an exclusive device heretofore. As a device for press-fitting and mounting such terminals to the substrates, for example, the Japanese Laid-Open Patent Publication No. 2005-071729,A discloses an invention of a contact press-fitting device. The contact press-fitting device disclosed in the Japanese Laid-Open Patent Publication No. 2005-071729,A is made up of: a contact grasping mechanism including a front and a rear grasping member for holding the press-fitting section from the front and the rear thereof, a pressing roller for moving a head of the rear grasping member forward and backward, and a vertical cylinder for rotating the front grasping member; and a mechanism for moving the contact grasping mechanism upward and downward. When the press-fitting section is held between the front grasping head and the rear grasping head, a contact section is received into the receiving space opened toward the lateral direction, and after the press-fitting section is press-fitted into a press-fitting hole of a substrate, the front grasping member is rotated so that the receiving space is located outside of the contact section in the lateral direction, thus the contact grasping mechanism moves upward so that the front grasping head does not interfere with the contact section.

With such the constitution, according to the invention of the contact press fitting device disclosed in the Japanese Laid-Open Patent Publication No. 2005-071729,A, no dimensional limitation for the front grasping member is needed, strength of the rear grasping member, of course, and of the front grasping member, also, can be designed to be a great value, the problem of damage can be solved, thus the contact can be automatically press-fitted into the press-fitting hole of the substrate with keeping a sufficient strength.

Further, there exists a contact which is made of a wire material, and a device for press-fitting the contact made of such a wire material into a substrate is also known. For example, the Japanese Patent Publication No. 2689001,B discloses an invention of a pin driving device for driving a pin (terminal) into a substrate. The pin driving device disclosed in the Japanese Patent Publication No. 2689001,B includes: a pair of feeding rollers for holding a wire material which is continuously fed, for imparting a feeding force to the wire material with its rotation, and for intermittently feeding the wire material by rotating at every predetermined time intervals ; a pair of forming tools which wait on the way of the feeding path for the wire material, and which molding-clamp to hold the wire material and at least form a taper-like section on one portion of the wire material during the stop moment of feeding of the wire material, a cutting mechanism for cutting the wire material which is subsequently fed upon completion of the forming process at the most diameter-reduced portion or its vicinity of the taper-like section; and a pin driving mechanism for receiving the wire material which is cut by the cutting mechanism and inserting into a substrate.

With such a constitution, according to the invention of the pin driving device disclosed in the Japanese Patent Publication No. 2689001,B, since the process of driving the wire material into the substrate can be automated, thus the process which is manually implemented in prior can be automated, the production efficiency can be improved.

Further, the Japanese Laid-Open Patent Publication No. 2008-282741,A discloses an invention of pin insertion mechanism for inserting a pin which is divided at a narrow part of a wire material into an object material such as a printed circuit board. The invention of the pin insertion mechanism disclosed in the Japanese Laid-Open Patent Publication No. 2008-282741,A includes: a pin feeding chuck section which reciprocatingly moves along the longitudinal direction of the wire material, and is disposed on the outside of the wire material so as to be able to hold the wire material; and an openable and closeable pin insertion chuck section which reciprocatingly moves along the longitudinal direction of the wire material, and is disposed one the outside of the pin feeding chuck section so as to be able to hold the wire material at the front side of the pin feeding chuck section; wherein the pin insertion chuck section rotates about the central axis of the wire material.

With such a constitution, according to the invention of the pin driving device disclosed in the Japanese Laid-Open Patent Publication No. 2008-282741,A since the narrow part is cut not by slice-cut but by twist-cut, thus the cutting scrapes are difficult to be generated and to be scattered over the object, and further, burrs and sags can be less generated on the tip of the pin which is cut apart from the wire material.

SUMMARY OF THE INVENTION

Problems to be Solved by the Invention

A press-fit terminal in which a wire material is formed with a press-fit section to be press-fitted into a through-hole formed in a substrate and a shoulder to be pressed by a jig is known. Such the press-fit terminal is press-fitted into and mounted onto the substrate by making use of the jig in the state that they are divided each other. On the other hand, in the case that the press-fit terminal is made of a wire material, one series of continuous press-fit terminal body in which a plurality of press-fit terminals are continuously joined is formed during the forming process. If the continuous press-fit terminal body can be continuously mounted onto the substrate etc. as in the respective inventions disclosed in the above Patent Documents, it can be very convenient since the production efficiency is improved.

However, the contact press-fitting device disclosed in the Japanese Laid-Open Patent Publication No. 2005-071729,A is the invention in which the contacts having press-fitting section which are laterally joined each other are press-fitted, thus it cannot apply to the terminals which are formed of the wire material. Further, in the inventions of pin driving device disclosed in the Japanese Laid-Open Patent Publication No. 2005-071729,A or of pin insertion mechanism disclosed in the Japanese Patent Publication No. 2689001,B, the pin to be driven has no press-fitting section; therefore, since a sufficient force for press-fitting the press-fit section into the substrate etc. cannot be obtained, it is difficult to mount the press-fit terminals. Therefore, in the inventions disclosed in the above Patent Documents, it is difficult to press-fit into and mount onto the continuous press-fit terminal body the member to be attached such as the substrate.

This invention aims to solve the such problem of the prior art, and aims to provide a press-fitting device being able to divide a continuous press-fit terminal body which is continuously fed and has shoulders into respective press-fit terminal and to press-fit into and mount onto a substrate etc.

Means for Solving the Problem

In order to solve the above problem, a press-fitting device of one aspect of the present invention is for mounting a press-fit terminal having a shoulder and a press-fit section to a member to be attached, and the press-fitting device includes: a base to which the member to be attached is mounted; a rear plate perpendicularly disposed with respect to the base; and a vertical operation section attached to the rear plate so as to move upward and downward; wherein the vertical operation section is provided with: an insertion passage through which a continuous press-fit terminal body made up of the plurality of press-fit terminal being serially formed on a wire material is inserted; at least one movable feeding means for feeding the continuous press-fit terminal body inserted inside the insertion passage into one direction; a dividing means for dividing the continuous press-fit terminal body into the respective press-fit terminals; and a mounting means for mounting the divided press-fit terminals onto the member to be attached; the rear plate is provided with a fixed feeding means which is stationary fixed with respect to the vertical operation section and restricts the movement of the continuous press-fit terminal body in response with the upward movement of the vertical operation section, the press-fit terminal is mounted onto the member to be attached by means of upward and downward movement of the vertical operation section.

Further, according to the press-fitting device of another aspect of the present invention, in the press-fitting device of one aspect, the movable feeding means has: a first attachment section attached to a front face opposite to the rear surface plate body of the vertical operation section; a first downward suspended section downwardly suspended from the central portion of the first attachment section; a first extended section extended from the lower side of the first downward suspended section toward the insertion passage; and a feeding claw section which is placed at both sides of the continuous press-fit terminal body inserted through the insertion passage of the distal end side of the first extended section and has a width being able to press the shoulder section; when the vertical operation section moves downward, at least one shoulder formed on the continuous press-fit terminal body is pressed by a first pressing section of the feeding claw section of the distal end side thereby the continuous press-fit terminal body is fed downward.

Further, according to the press-fitting device of another aspect of the present invention, in the press-fitting device of one aspect, the movable feeding means is attached so as to be able to move apart from the front face of the vertical operation section with the first attachment section as a fulcrum; the feeding claw section is formed with a first slant section inclining toward the insertion passage at the upper opposing side of the first pressing section thereof; when the vertical operation section moves upward, since the shoulder section of the continuous press-fit terminal body which is restricted to move upward together with the vertical operation section by the fixed feeding means abuts the first slant section of the feeding claw section and the movable feeding means moves in a direction apart from the insertion passage with the first attachment section as the fulcrum, thus the shoulder section and the press-fit section of the continuous press-fit terminal body can be passed through the insertion passage.

Further, according to the press-fitting device of another aspect of the present invention, in the press-fitting device of one aspect, the mounting means is provided with a movable press-fitting means, and the movable press-fitting means has: a second attachment section attached to a front face opposite to the rear surface plate body of the vertical operation section; a second downward suspended section downwardly suspended from the central portion of the second attachment section; a second extended section extended from the lower side of the second downward suspended section toward the insertion passage; and a press-fitting claw section which is placed at both sides of the continuous press-fit terminal body inserted through the insertion passage of the distal end side of the second extended section and has a width being able to press the shoulder section; when the vertical operation section moves downward, the shoulder of the press-fit terminal which is divided by the dividing means from the continuous press-fit terminal body is pressed by a second pressing section of the press-fitting claw section of the distal end side, thus the press-fit terminal is mounted onto the member to be attached.

Further, according to the press-fitting device of another aspect of the present invention, in the press-fitting device of one aspect, the movable press-fitting means is attached so as to be able to move apart from the front face of the vertical operation section with the second attachment section as a fulcrum; the feeding claw section is formed with a second slant section inclining toward the insertion passage at the upper opposing side of the second pressing section thereof; when the vertical operation section moves upward, since the shoulder section of the press-fit terminal which is restricted to move upward together with the vertical operation section by the fixed feeding means abuts the second slant section of the press-fitting claw section and the movable press-fitting means moves in a direction apart from the insertion passage with the second attachment section as the fulcrum, thus the shoulder section and the press-fit section of the press-fit terminal can be passed through the insertion passage.

Further, according to the press-fitting device of another aspect of the present invention, in the press-fitting device of one aspect, the fixed feeding means has: a support member which is attached to the rear plate and extended to a front face side opposite to the rear plate; a third attachment section attached to the support member; a third downward suspended section downwardly suspended from the central portion of the third attachment section; a third extended section extended from the lower side of the third downward suspended section toward the insertion passage; and a restraining claw section placed at both sides of the continuous PF terminal body inserted through the insertion passage of the distal end side of the third extended section and has a width being able to press the shoulder section; when the vertical operation section moves upward, since at least one shoulder section formed on the continuous press-fit terminal body is engaged with a third pressing section of the lower end side of the restraining claw section, thus upward movement of the continuous press-fitting terminal body together with the vertical operation section is restricted.

Further, according to the press-fitting device of another aspect of the present invention, in the press-fitting device of one aspect, the fixed feeding means is attached so as to be able to move apart from a front face of the vertical operation section with the third attachment section as a fulcrum; the restraining claw section is formed with a third slant section inclining toward the insertion passage at the upper opposing side of the third pressing section thereof; when the vertical operation section moves upward, since the shoulder section of the continuous press-fit terminal body which is fed downward by the movable feeding means abuts the third slant section of the restraining claw section and the fixed feeding means moves in a direction apart from the insertion passage with the third attachment section as the fulcrum, thus the shoulder section and the press-fit section of the continuous press-fit terminal body can be passed therethrough.

Further, according to the press-fitting device of another aspect of the present invention, in the press-fitting device of one aspect, the dividing means is provided with a twist cutting section rotatably disposed about the insertion passage as its axis; after a press-fit terminal of the distal end side of the continuous press-fit terminal body which is just before dividing is introduced into the insertion passage of the twist cutting section, as the twist cutting section is rotated at a predetermined angle, the press-fit terminal is divided by rotation of the press-fit terminal of the distal end side with respect to the continuous press-fit terminal body, and subsequently to the division, the twist cutting section is returned to the original position by further one round of rotation or a rotating to the reverse direction.

Further, according to the press-fitting device of another aspect of the present invention, in the press-fitting device of the first aspect, the rear plate is provided with a power unit having a vertically movement cam for moving the vertical operation section upward and downward, the vertical operation section moves upward and downward in one reciprocating motion since the vertically movement cam rotates on time.

Advantageous Effect of Invention

This invention exhibits the following excellent effect due to being provided with the above constitution. According to the press-fitting device of one aspect of the present invention, it can be achieved that the continuous press-fit terminal body in which a plurality of press-fit terminals are serially formed on the wire material is used, and that this continuous press-fit terminal body is divided into the respective press-fit terminals and to continuously mount the press-fit terminals onto the member to be attached such as a substrate and a connector.

Further, according to another aspect of the press-fitting device of the present invention, by means of the first pressing section of the feeding claw section provided on the movable feeding means provided on the vertical operation section as a means for feeding the continuous press-fit terminal body, the shoulder formed on the continuous press-fit terminal body is pressed, thus the continuous press-fit terminal body can be fed. Further, in comparing with the prior device in which the terminal is held, the device can feed the continuous press-fit terminal body more certainly.

Further, in order that the movable feeding means feeds the continuous press-fit terminal body downward, the insertion passage of the movable feeding means is formed to have a width so as to press the shoulder section which protrudes wider than the width of the wire material of the continuous press-fit terminal body. Therefore, when the vertical operation section moves upward, the shoulder section and the press-fit section which protrude wider than the width of the wire material of the continuous press-fit terminal body engage with the movable feeding section, thus they cannot pass through the insertion passage. However, according to the press-fitting device of another aspect of the present invention, since the movable feeding means is provided with the first attachment section attached therewith so as to be able to move apart from the insertion passage of the vertical operation section, when the shoulder section and the press-fit section of the continuous press-fit terminal body which is restricted to move abut the first slant section of the feeding claw section of the movable feeding means which moves upward, the movable feeding means moves apart from the insertion passage with the first attachment section as a fulcrum, thus the continuous press-fit terminal body can be passed through the insertion passage. Therefore, the press-fit terminal body can be smoothly fed by the vertical operation section only moving upward and downward.

Further, according to the press-fitting device of another aspect of the present invention, by means of the press-fitting claw section which is provided on the vertical operation section as a means for mounting the press-fit terminal divided apart from the continuous press-fit terminal body to the member to be attached, with the downward movement of the vertical operation section, the shoulder section of the press-fit terminal can be pressed and the press-fit terminal can be mounted.

Further, in order that the movable press-fitting means mounts the press-it terminal to the substrate, the insertion passage of the movable press-fitting means is formed to have a width so as to press the shoulder section which protrudes wider than the width of the wire material of the press-fit terminal. Therefore, when the vertical operation section moves upward, the shoulder section and the press-fit section protruding wider than the width of the wire material of the press-fit terminal which is divided for and disposed for subsequent mounting process cannot pass through the insertion passage. However, according to the press-fitting device of another aspect of the present invention, since the movable press-fitting means is provided with the second attachment section which is movable apart from the insertion passage, when the shoulder section and the press-fit section of the press-fit terminal which is restricted to move abut the second slant section, the movable press-fitting means moves apart from the insertion passage with the second attachment section as a fulcrum, thus the shoulder section and the press-fit section can be passed through the insertion passage. Therefore, the press-fit terminal body can be smoothly mounted by the vertical operation section moving only upward and downward.

Further, according to the press-fitting device of another aspect of the present invention, since the shoulder section formed on the continuous press-fit terminal body is engaged with the restraining claw section of the fixed feeding means provided on the rear surface plate body when the vertical operation section moves upward, the continuous press-fit terminal body can be restricted to move upward together with the upward movement of the vertical operation section and can be fed downward with respect to the vertical operation section moving upward.

Further, in order that the fixed feeding means restricts the upward movement of the continuous press-fit terminal body together in response with the upward movement of the vertical operation section, the insertion passage of the fixed feeding means is formed to have a width so as to press the shoulder section which protrudes wider than the width of the wire material of the continuous press-fit terminal body. Therefore, when the vertical operation section moves downward, the shoulder section and the press-fit section which protrude wider than the width of the wire material of the continuous press-fit terminal body cannot pass through the insertion passage. However, according to the press-fitting device of another aspect of the present invention, since the fixed feeding means is provided with the third attachment section attached therewith so as to be able to move apart from the insertion passage of the vertical operation section, when the shoulder section and the press-fit section of the continuous press-fit terminal body which is restricted to move downward to abut the third slant section of the fixed feeding means, the fixed feeding means moves apart from the insertion passage with the third attachment section as a fulcrum, thus the continuous press-fit terminal body can be passed through the insertion passage. Therefore, the press-fit terminal body can be smoothly fed by the vertical operation section only moving upward and downward.

Further, according to the press-fitting device of another aspect of the present invention, since the dividing process of the continuous press-fit terminal body into the press-fit terminal is implemented by a twist cut action, the cutting surface exhibits a spiral shape, thus the burrs which may be formed if it is slice cut can be less generated. Further, after the press-fit terminals are divided by rotating the twist cutting section at a predetermined angle, the twist cutting section returns to the original position and is prepared for the subsequent dividing process, As for the method for returning the twist cut section to the original position, there are a method in which the twist cutting section is rotated at the predetermined angle to divide the press-fit terminal and thereafter the twist cutting section is rotated for one round in the same direction (the method to rotate at 360° from the original position) and another method in which the twist cutting section is rotated at a predetermined angle and thereafter the twist cutting section is rotated in the opposite direction. These methods can be selected in accordance with the specifications of the press-fitting device and the facilities to which the press-fitting device is installed. In this way, according to the press-fitting device of the eighth aspect, since the twist cutting section which is cut is returned to the original position and is oriented to the predetermined direction for mounting to the member to be attached, thus dividing the continuous press-fit terminal body can be repeatedly implemented. Here, the predetermined angle can be any angle to which the press-fit terminal disposed on the distal end side of the continuous press-fit terminal body can be rotated and twisted and cut, e.g. from 110° to 150°. Further, since the dividing angle is different depends on the thickness and the material of the press-fit terminal etc., therefore, the angle suitable for dividing in accordance with the press-fit terminal terminals to be used can be selected.

According to the press-fitting device of another aspect of the present invention, since the movement of the vertical operation section can be implemented by only rotating the vertically movement cam, thus the press-fit terminals are continuously mounted with a high efficiency.

BRIEF DESCRIPTION OF THE DRAWINGS

FIG. 3A shows a top plan view of a press-fit terminal. FIG. 3B shows a top plane view of a continuous press-fit terminal body.

FIG. 4A shows a front enlarged and elevational view of a movable feeding means. FIG. 4B shows a side elevational view. FIG. 4C shows a side elevational view of the state in which the movable feeding means is moved from the state shown in FIG. 4B. FIG. 4D shows a front elevational view of the movable feeding means only. FIG. 4E shows a side elevational view.

FIG. 5A shows a front elevational view of a dividing means in enlarged and partially cut state. FIG. 5B shows a side elevational view in partially cut state. FIGS. 5C and 5D show typical perspective views of the continuous press-fit terminal body in the divided state.

FIG. 7A shows a front enlarged and elevational view of a fixed feeding means. FIG. 7B shows a side elevational view. FIG. 7C shows a side elevational view of the state in which the fixed feeding means is moved from the state shown in FIG. 7B. FIG. 7D shows a front elevational view of the fixed feeding means only. FIG. 7E shows a side elevational view.

EXEMPLARY EMBODIMENT OF THE INVENTION

Figure 1:
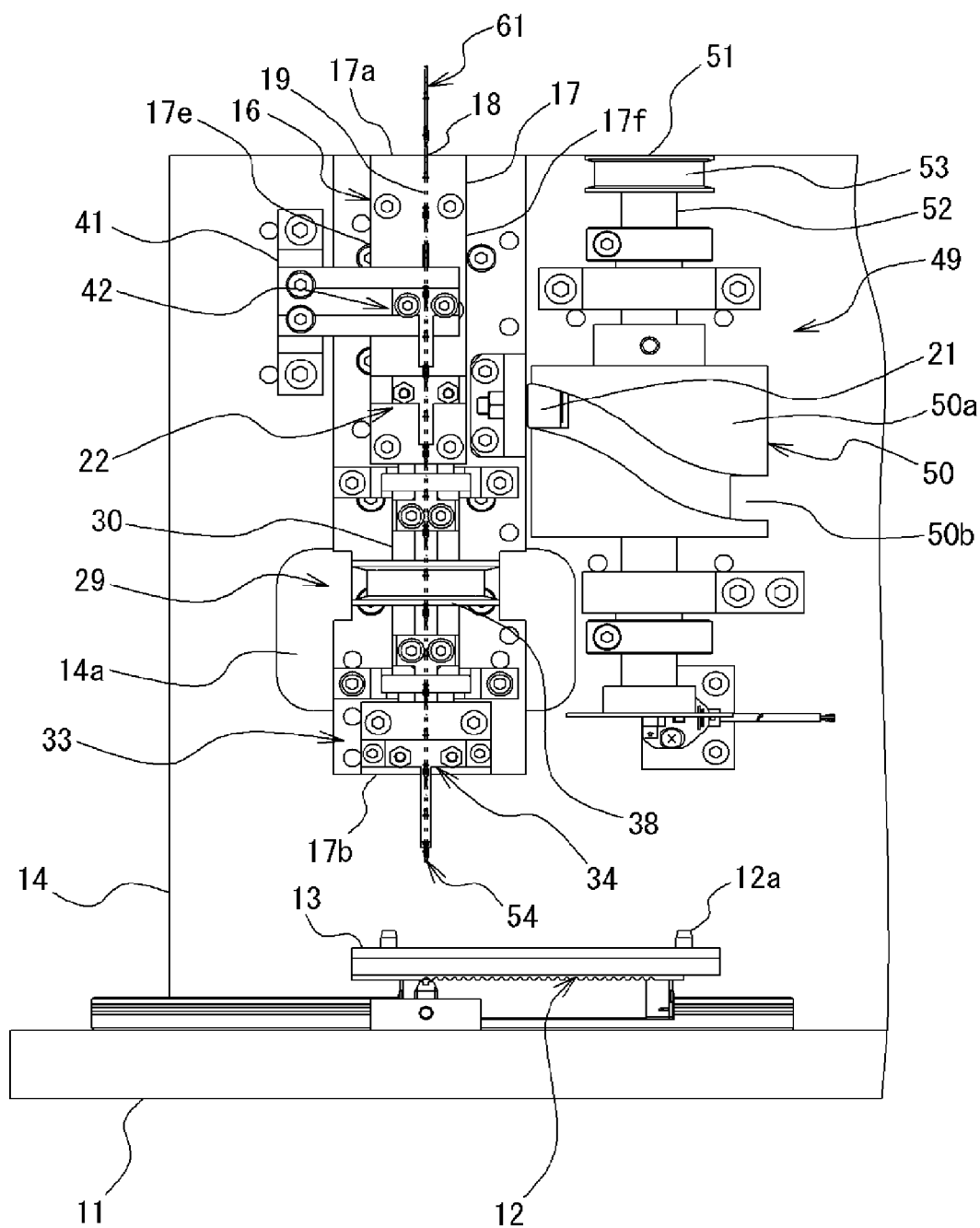
FIG. 1 shows a front elevational view of a press-fitting device of one embodiment.

An embodiment of the present invention will be described hereinafter with referring to the drawings. The following embodiment is to exemplify a press-fitting device for embodying the technical concept of the present invention, and is not intended to limit the present invention into the following embodiment but can also be equally applicable to other embodiments within the scope of the claims.

Embodiment

Figure 2:
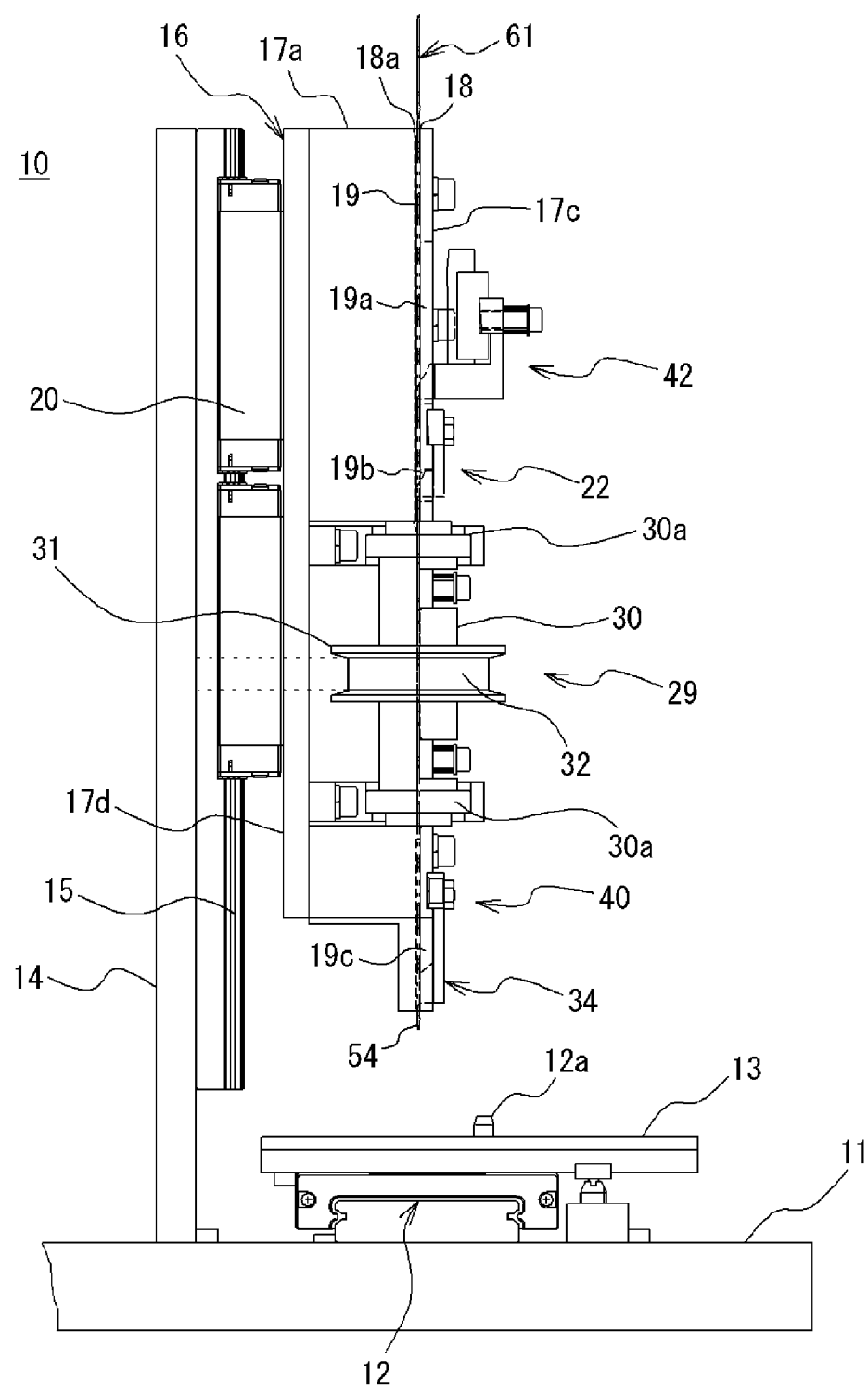
FIG. 2 shows a side elevational view of the press-fitting device of the embodiment.

The press-fitting device 10 of the embodiment is, as shown in FIGS. 1 and 2, a device for feeding a continuous press-fit terminal body 61 (hereinafter referred to as continuous PF terminal body, refer to FIG. 3B), dividing the continuous PF terminal body into a respective press-fit terminal 54 (hereinafter referred to as PF terminal, refer to FIG. 3A), and continuously performing the mounting process of the PF terminal to a mounting member 13 such as a housing constituting a substrate or connector.

The PF terminal 54 and the continuous PF terminal body 61 used in the press-fitting device 10 are explained first of all, before the press-fitting device 10 of the embodiment is explained. The continuous PF terminal body 61 is, as shown in FIG. 3B, formed so that the plurality of PF terminals 54 are continuously formed in a wire material. The PF terminal 54 is formed, as shown in FIG. 3A, with a distal section 56 to be inserted to asubstrate at one end and a connecting section 57 at the other end. A press-fit section 58 (hereinafter referred to as PF section) is formed on the wire material 55 at the distal section 56 side. Shoulders 59 are formed above the PF section 58, i.e. the side at which the connecting section 57 is formed, adjacent to the PF section 58.

The continuous PF terminal body 61 is formed in one line as one wire material 55 having joining sections 60 in which the distal section 56 of one PF terminal 54 is joined to the connecting section 57 of another PF terminal 54 and is the state before it is divided into the several PF terminal 54. The joining section 60 is formed as a valley shape so that the distal section 56 and the connecting section 57 are tapered. The continuous PF terminal body 61 formed in this way is used in the press-fitting device 10 of the embodiment.

Next, the press-fitting device 10 according to the embodiment will be explained with reference to FIGS. 1 to 7. The press-fitting device 10 has: a base 11 to be mounted on a work bench or a floor of a work area and for mounting the mounting member 13; a rear plate 14 uprightly disposed on the base 11; a vertical operation section 16 attached to the rear plate 14 so as to move upward and downward repeatedly with respect to the rear plate 14; and a power unit 49 for moving the vertical operation section 16 upward and downward.

The base 11 is formed as a planer body of a predetermined thickness and having a rectangular shape. The base 11 is provided on its upper surface with a mounting member installing structure 12 to which the mounting member 13 such as a substrate and a housing to which the PF terminals 54 are installed are mounted and with the rear plate 14 uprightly and vertically disposed on the base 11.

The mounting member installing structure 12 is to mount the mounting member 13 and is able to move the mounting member 13 in a predetermined intervals in response to the installation of the PF terminals 54. In this way, the PF terminals 54 can be continuously installed with the predetermined intervals. This movement can be achieved by providing a screw gear on the base 11 and a groove on the mounting member installing structure 12 which groove engages with the screw gear and by rotating the gear.

The configuration such that the mounting member installing structure 12 moves by the predetermined distance is provided by disposing: a threaded rod on the base 11 in a rotatable manner about the axis thereof around which elongated rod member is formed with threaded grooves in a predetermined pitch; and a protrusion on the mounting member installing structure 12 which protrusion engages with the threaded grooves, and by rotating the threaded rod. The invention is not limited to the above configuration, but other known configurations can be used. Further, the mounting member installing structure 12 is provided with a fixing section 12a on its upper side.

The rear plate 14 is formed as a plate body having a predetermined square area and on which rear plate 14 the vertical operation section 16, a fixed feeding means 42, and a power unit 49 are disposed.

The vertical operation section 16 has an operation section main body 17 which is formed in an elongated parallelepiped rectangular shape. The operation section main body 17 is constituted of a top face 17a formed with a feed port 18 into which the continuous PF terminal body 61 is fed, a bottom face 17b from which side the PF terminals 54 are ejected, a rear face 17d on the rear plate 14 side, a front face 17c opposing to the rear face 17d, and both side faces 17e, 17f. The vertical operation section 16 is linearly formed inside thereof with an insertion passage 19 which penetrates from the feed port 18 of the top face 17a throughout to the bottom face 17b. The continuous PF terminal body 61 and the PF terminals 54 are inserted trough the insertion passage 19.

The insertion passage 19 is formed in a rectangular or quadrilateral shape so as to correspond to the cross sectional shape of the wire material 55 constituting the continuous PF terminal body 61 and the PF terminal 54. By forming in this shape, the continuous PF terminal body 61 and the PF terminals 54 can be inserted through the insertion passage 19 in a uniform orientation. Further, the feed port 18 formed in the top face 17a of the vertical operation section 16 is provided with a taper 18a for receiving the continuous PF terminal body 61 easily.

Further, the vertical operation section 16 is further provided on the front face 17c with: a movable feeding means 22 for feeding the continuous PF terminal body 61 downward through the insertion passage 19 in response to the downward movement of the vertical operation section 16; a dividing means 29 for dividing the continuous PF terminal body 61 into the individual PF terminals 54; and a mounting means 33 for mounting the divided PF terminals 54 onto the mounting member 13. The dividing means 29 is disposed about the insertion passage 19 as its central axis in a rotatable manner.

The movable feeding means 22 moves vertically along with the vertical operation section 16 attached therewith and includes: as shown in FIG. 4, a first attachment section 23 attached to the front face 17c of the vertical operation section 16; a first downward suspended section 24 downwardly suspended toward the position corresponding to the insertion passage 19 located at the central part of the first attachment section 23; a first extended section 25 extended from the lower side of the first downward suspended section 24 toward the insertion passage 19 side; and a feeding claw section 26 having a first pressing section 27 at the distal end of the first extended section 25 which first pressing section 27 holds the continuous PF terminal body 61 inserted through the insertion passage 19 and has a width being able to press the shoulder section 59 (refer to FIG. 4D, 4E).

Since the shoulder section 59 of the continuous PF terminal body 61 is pressed by this feeding claw section 26, the continuous PF terminal body 61 is fed downward during the downward movement of the vertical operation section 16. The vertical operation section 16 has a first groove section 19a in the front face 17c side which is formed so that the distal end side of the feeding claw section 26 can abut to the continuous PF terminal body 61 in the insertion passage 19 (refer to FIGS. 4B, 4C).

The movable feeding means 22 is attached e.g. by means of a bolt so as to be able to move apart from the front face 17c of the vertical operation section 16 with the first attachment section 23 as a fulcrum (refer to FIG. 4C). The feeing claw section 26 is formed with a first slant section 28 inclining toward the insertion passage 19 at the upper opposite side opposing to the first pressing section 27.

The dividing means 29 is disposed between the movable feeding means 22 of the vertical operation section 16 and the mounting means 33 thereof as shown in FIGS. 5A, 5B. The dividing means 29 is provided with a twist cutting section 30 rotatably disposed about the insertion passage 19 as its axis. This twist cutting section 30 is the section for dividing the continuous PF terminal body 61 which is inserted through the insertion passage 19 of the dividing means 29 into PF terminals 54 by rotating the twist cutting section 30 to rotate the insertion passage 19 itself in the twist cutting section 30 and, through this rotation, applying stress to the joining section 60 of the continuous PF terminal body 61. Bearings 30a are disposed above and below the twist cutting section 30 for bearing the rotation.

In the dividing means 29 of the embodiment, twist cutting section 30 has a rotating section 31 around which an annular groove is formed, and to which rotating section 31 a driving belt 32 linked with the driving member such as a motor (not shown) is wound. With moving the driving belt 32 by the driving member, the rotating section 31 is rotated to rotate the twist cutting section 30. The twist cutting section 30 rotates in one direction, and returns to the original position by rotating one round afterward one PF terminal 54 is divided from the continuous PF terminal body 61. In this way, the divided PF terminal 54 can be back to the original position and can eject throughout the insertion passage. Further, the PF terminal can be mounted in the predetermined orientation. By rotating the twist cutting section 30 for one round, the speed for returning the twist cutting section to the original position afterward dividing the PF terminal can be increased. Since the dividing the PF terminals is implemented during the rotation of the twist cutting section, the twist cutting section can be returned to the original position by continuously rotating the twist cutting section in the same direction without any other extra operations.

The twist cutting section can be returned to the original position by not only rotating the twist cutting section for one round but also rotating the twist cutting section in the opposite direction after the twist cutting section is rotated at the predetermined angle and the PF terminals are divided. In this way, methods corresponding to the specifications of the press-fitting device and the facilities to which the press-fitting device is installed are selected, thus the variation of the design can be increased. Here, the predetermined angle can be any angle to which the press-fit terminal disposed on the distal end side of the continuous press-fit terminal body can be rotated and twisted and cut, e.g. from 110° to 150°. Since the dividing angle is different depends on the thickness and the material of the PF terminal etc., therefore, the suitable angle can be selected according to the PF terminals to be used. For example, the thick PF terminal and PF terminal of large size can be divided even if the rotating angle is small. In this case, the speed for dividing the PF terminals can be increased since the twist cutting section can be reversed back in a smaller angle.

The PF terminals can also be divided by half-rotating (rotating by 180°) the twist cutting section. The PF terminals are divided by repeatedly implementing the half rotation afterward the dividing of the PF terminal without the operation of returning the half-rotated twist cutting section to the original position. In this way, the speed of the process for dividing the PF terminals can be increased. The methods for the half rotation can be the rotation in the same direction or the rotation of repeatedly inverted in every half rotation.

The driving member for moving the driving belt 32 wound around the rotating section 31 can be disposed in any desired places. In the embodiment, since the driving member is disposed on the back side of the rear plate 14, the hole 14a through which the driving belt 32 is communicated and which can accommodate the movement of the driving belt 32 which moves upward and downward along with the vertical operation section 16 is formed in the rear plate 14.

The mounting means 33 mounts the PF terminals 54 which are divided by the dividing means 29 to the mounting member 13. A member such as a substrate and a contact housing can be used as the mounting member 13. In this embodiment, a substrate is used.

The mounting means 33 is provided with a movable press-fitting means 34 for mounting the PF terminal 54 which is inserted through the insertion passage 19 to the mounting member 13 as shown in FIG. 6. The movable press-fitting means 34 is constituted of: a second attachment section 35 attached to the front face 17c of the vertical operation section 16; a second downward suspended section 36 downwardly suspended from the central portion so as to correspond to the insertion passage 19 of the second attachment section 35; a second extended section 37 extended from the lower side of the second downward suspended section 36 toward the insertion passage 19 side; and a press-fitting claw section 38 having a second pressing section 39 which is placed at both sides of the PF terminal 54 inserted through the insertion passage 19 of the distal end side of the second extended section 37 and has a width being able to press the shoulder section 59 (refer to FIGS. 6D, 6E).

The PF terminal 54 is press-fitted and mounted to the mounting member 13 since the press-fitting claw section 38 presses the shoulder section 59 of the PF terminal 54. The vertical operation section 16 has a second groove section 19b in the front face 17c side which is formed so that the distal end side of the press-fitting claw section 38 can abut to the PF terminal 54 in the insertion passage 19 (refer to FIGS. 6B, 6C).

Figure 6C:
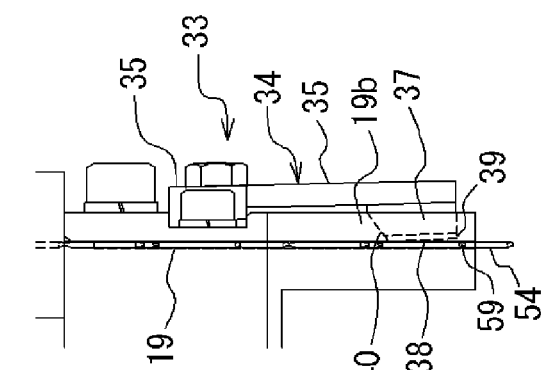
FIG. 6C shows a side elevational view of the state in which the movable press-fitting means is moved from the state shown in FIG. 6B.
Figure 6B:
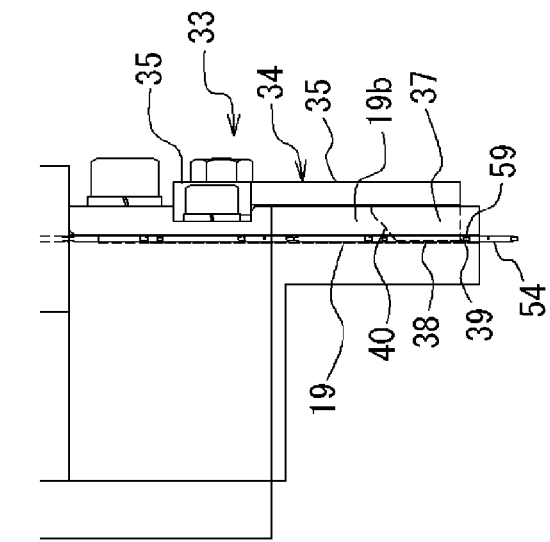
FIG. 6B shows a side elevational view.
Figure 6E:
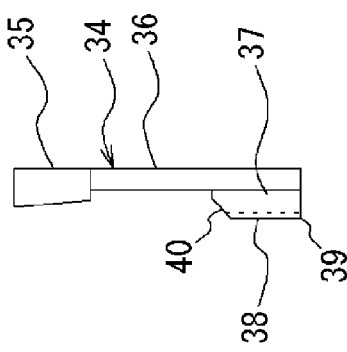
FIG. 6E shows a side elevational view.
Figure 6A:
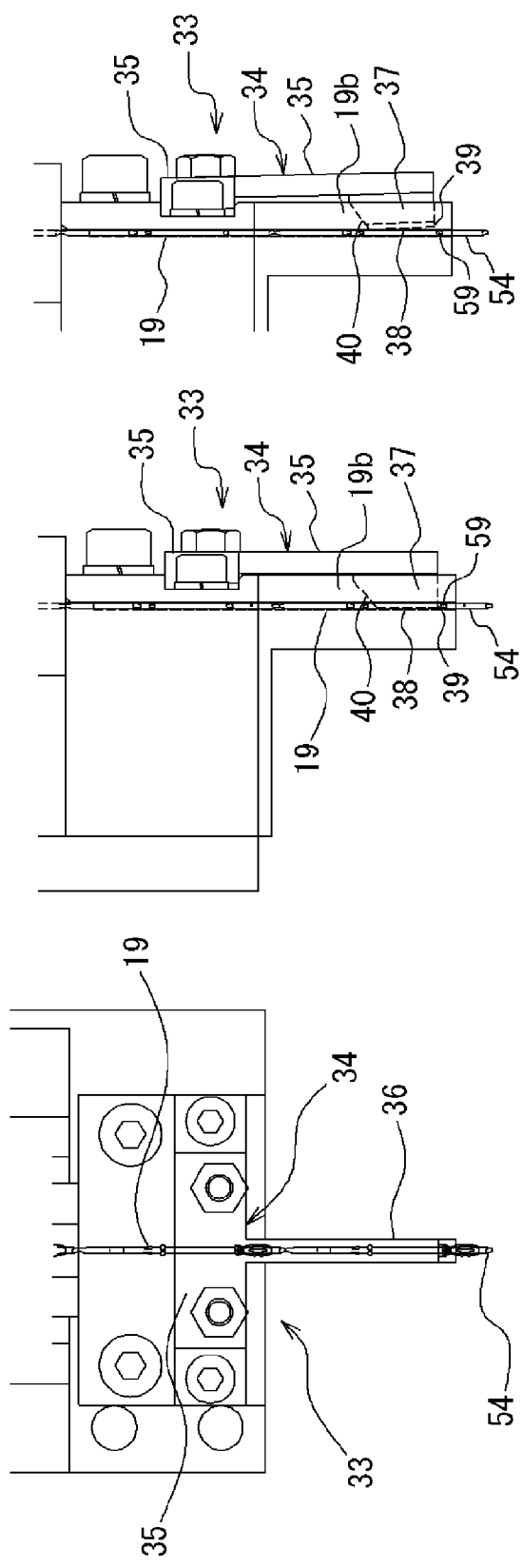
FIG. 6A shows an enlarged front elevational view of an insertion means.
Figure 6D:
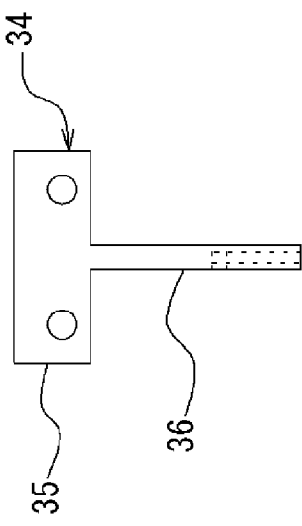
FIG. 6D illustrates a front elevational view of a second attachment section.

The movable press-fitting means 34 is attached so as to be able to move apart from the front face 17c of the vertical operation section 16 with the second attachment section 35 as a fulcrum (refer to FIG. 6C). This attachment is implemented by bolts etc. The press-fitting claw section 38 is formed with a second slant section 40 inclining toward the insertion passage 19 at the upper opposite side opposing to the second pressing section 39.

The rear plate 14 is provided with a fixed feeding means 42. The fixed feeding means 42 is provided with a support member 41 which is fixed onto the rear plate 14 and extended to the front face 17c of the vertical operation section 16 as shown in FIG. 7. The support member 41 is formed so as to wrap around from the rear plate 14 located on the rear face 17d side of the vertical operation section 16 to the front face 17c vertical operation section 16. The support member 41 is an L shape so as to stand from the rear plate 14, then bend at the right angle, and extend to the front face 17c of the vertical operation section 16. Therefore, the support member 41 does not move even if the vertical operation section 16 moves.

The support member 41 is provided with a fixed feeding means 42. The fixed feeding means 42 is constituted of: a third attachment section 43 attached to the support member 41; a third downward suspended section 44 downwardly suspended from the central portion of the third attachment section 43 so as to correspond to the insertion passage 19; a third extended section 45 protruding from the lower side of the third downward suspended section 44 toward the insertion passage 19 side; and a restraining claw section 46 having a third pressing section 47 which is placed at both sides of the continuous PF terminal body 61 inserted through the insertion passage 19 of the distal end side of the third extended section 45 and has a width being able to press the shoulder section 59 (refer to FIGS. 7D, 7E).

Since the shoulder section 59 of the continuous PF terminal body 61 is pressed by this restraining claw section 46, the upward movement of the continuous PF terminal body 61 during the upward movement of the vertical operation section 16 can be restricted, as a result, the continuous PF terminal body 61 can be fed downward with respect to the vertical operation section 16. The vertical operation section 16 has a third groove section 19c in the front face 17c side which is formed so that the distal end side of the restraining claw section 46 can abut to the continuous PF terminal body 61 in the insertion passage 19 (refer to FIGS. 7A-7C).

The fixed feeding means 42 is attached so as to be able to move apart from the front face 17c of the vertical operation section 16 with the third attachment section 43 as a fulcrum (refer to FIG. 7C). This attachment is implemented by bolts etc. The restraining claw section 46 is formed with a third slant section 48 inclining toward the insertion passage 19 at the upper opposite side opposing to the third pressing section 47.

As shown in FIG. 2, the rear plate 14 is provided with a track section 15 such as a rail for moving the vertical operation section 16 upward and downward on the side on which the vertical operation section 16 is disposed. The vertical operation section 16 is provided on the rear face 17*d* with a movable section 20 for engaging with the track section 15 so as to correspond to the track section 15. As the movable section 20 moves upward and downward along the track section 15, the vertical operation section 16 moves upward and downward.

As shown in FIG. 1, the power unit 49 is provided with a rotation axis 52 and a vertically movement cam 50 disposed on the rotation axis 52. The rotation axis 52 is provided with a transmission section 51 around which a belt body 53 for transmitting the driving power from the driving member such as a motor is wound. The rotation axis 52 is rotated by the rotation transmitted from the belt body 53 to the transmission section 51. The vertically movement cam 50, which is formed of a circular disc body having a predetermined diameter and a predetermined thickness, is configured so as to rotate by being disposed so that the center of the rotation axis 52 and the center of the vertically movement cam 50 are corresponded each other.

The vertically movement cam 50 is formed with a groove 50*b* on the circumference side face 50*a* thereof, and the groove 50*b* and a protrusion section 21 disposed on the vertical operation section 16 are engaged with each other. The groove 50*b* is formed so that the protrusion section 21 moves in one reciprocating motion between the uppermost portion and the lowermost portion while the vertically movement cam 50 rotates one round. Thus, the vertical operation section 16 which is provided with the protrusion section 21 moves upward and downward in one reciprocating motion synchronizing with the motion of protrusion section 21 while the vertically movement cam 50 rotates one round.

Next, referring now to FIGS. 8 and 9, the process for mounting the PF terminals 54 to the member to be attached 13 will be explained. In the press-fitting device 10 of the embodiment, as shown in FIGS. 1 and 2, the fixed feeding means 42, the movable feeding means 22, the dividing means 29, and the mounting means 33 are disposed in order from the top, and the power unit 49 is disposed in the side face side thereof. The protrusion section 21 of the vertical operation section 16 is engaged with the groove 50*b* formed on the vertically movement cam 50 of the power unit 49. Here, as shown in FIGS. 8A and 9A, one cycle or the process starting with positioning the vertical operation section 16 at the uppermost position, thereafter mounting one PF terminal 54, and returning to the original position will be explained.

First of all, as the twist cutting section 30 of the dividing means 29 of the vertical operation section 16 rotates, the PF terminal 54 of the distal end side of the continuous PF terminal body 61 is also rotated together. When the PF terminal 54 is rotated at a predetermined angle, the distal end portion of the continuous PF terminal body 61 inserted through the insertion passage 19 of the dividing means 29 is twisted and cut off, and is divided into the PF terminal 54 (refer to FIGS. 5A, 5B). The twist cutting section 30 which divides the PF terminal 54 further rotates one round and returns to the original position, and is prepared for the subsequent dividing process.

Figure 8A:
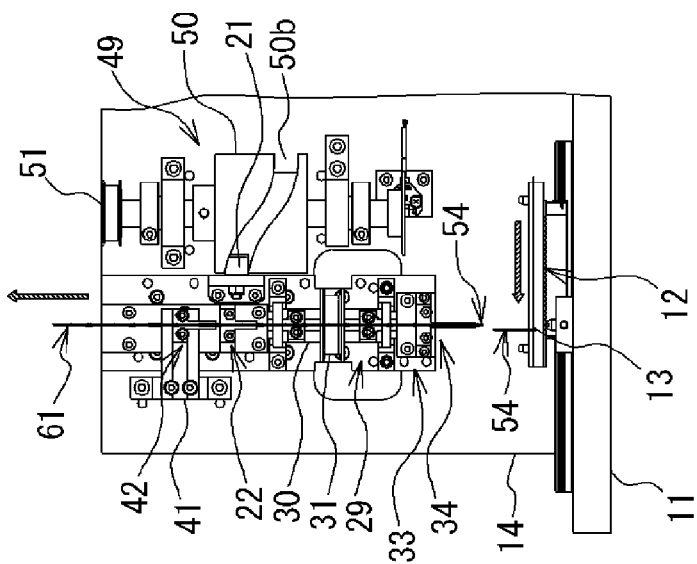
FIGS. 8A to 8C show front elevational views depicting a process for mounting the press-fit terminal by making use of the press-fitting device.
Figure 8B:
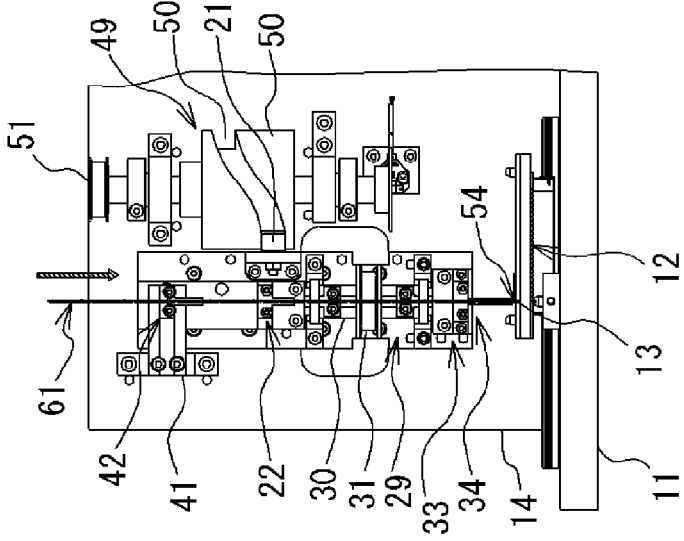

Next, as shown in FIGS. 8A and 8B, the vertical operation section 16 moves downward by rotating the vertically movement cam 50 of the power unit 49 and moving the protrusion section 21 disposed on the vertical operation section 16 along the groove 50*b* formed on the vertically movement cam 50. With this downward movement, the continuous PF terminal body 61 is fed downward by means of the feeding claw section 26 of the movable feeding means 22. At this moment, the distal portion of the continuous PF terminal body 61 is inserted into the insertion passage 19 of the dividing means 29 and waits the subsequent dividing process. Further, with this downward movement, the PF terminal 54 positioned in the movable press-fitting means 34 of the mounting means 33 is pressed by the press-fitting claw section 38 at the shoulder section 59 thereof and is press-fitted and mounted to the substrate which is the mounting member 13.

Since the fixed feeding means 42 does not move downward in accordance with the vertical operation section 16 when the vertical operation section 16 moves downward, it is necessary that the restraining claw section 46 of the fixed feeding means 42 does not obstruct the movement of the continuous PF terminal body 61 which is fed through the insertion passage 19. Therefore, the fixed feeding means 42 is configured so as to move apart from the insertion passage 19 with the third attachment section 43 as the fulcrum (refer to FIG. 7C). In this way, when the shoulder section 59 of the continuous PF terminal body 61 which is fed downward abuts the first slant section 28 of the restraining claw section 46, the fixed feeding means 42 moves in the direction apart from the insertion passage 19 with the third attachment section 43 as a fulcrum. Thus, the restraining claw section 46 moves outward from inside of the insertion passage 19 to widen the insertion passage 19 and the shoulder section 59 and the PF section 58 of the continuous PF terminal body 61 can be passed therethrough. Since the third slant section 48 is formed on the upper portion of the restraining claw section 46, the movement of the fixed feeding means 42 due to the abutment of the shoulder section 59 of the continuous PF terminal body 61 is smoothened. When the PF terminal 54 is mounted, the vertical operation section 16 is positioned at the lowermost position.

Figure 8C:
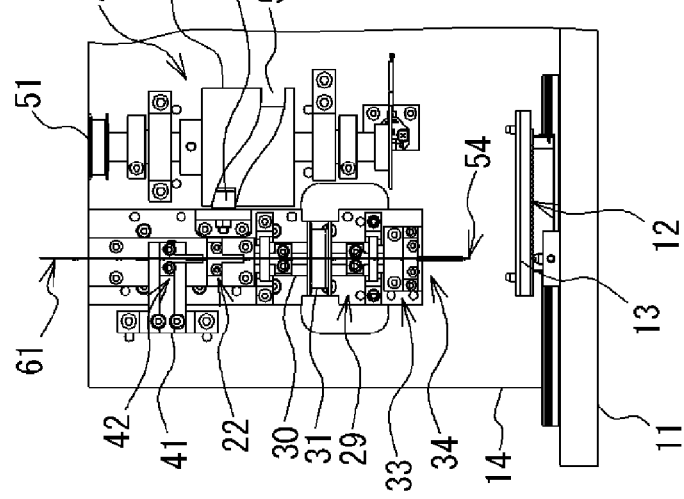
Figure 9C:
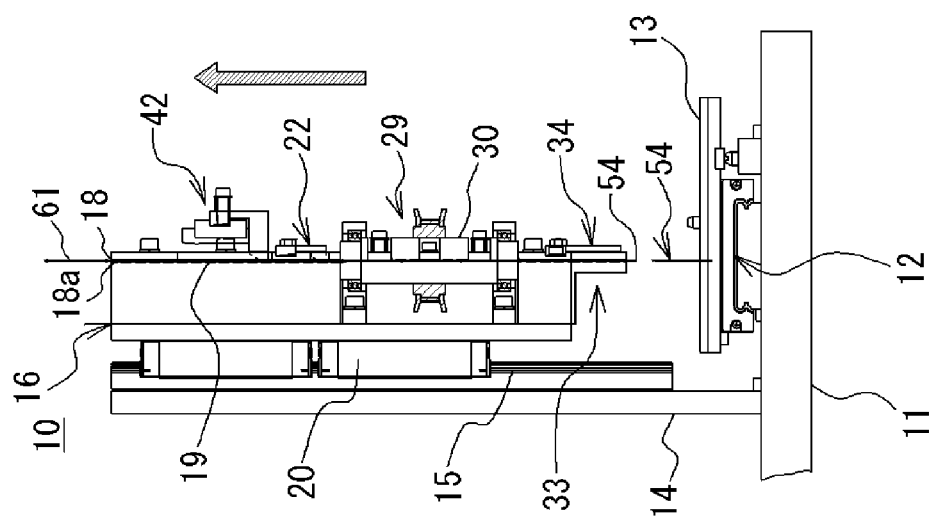
FIGS. 9A to 9C show side elevational views depicting a process for mounting the press-fit terminal by making use of the press-fitting device.
Figure 9B:
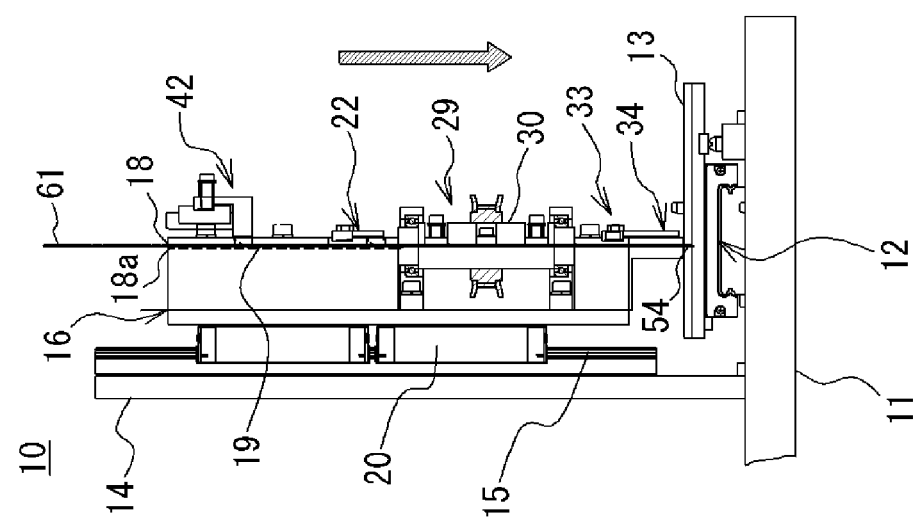
Figure 9A:
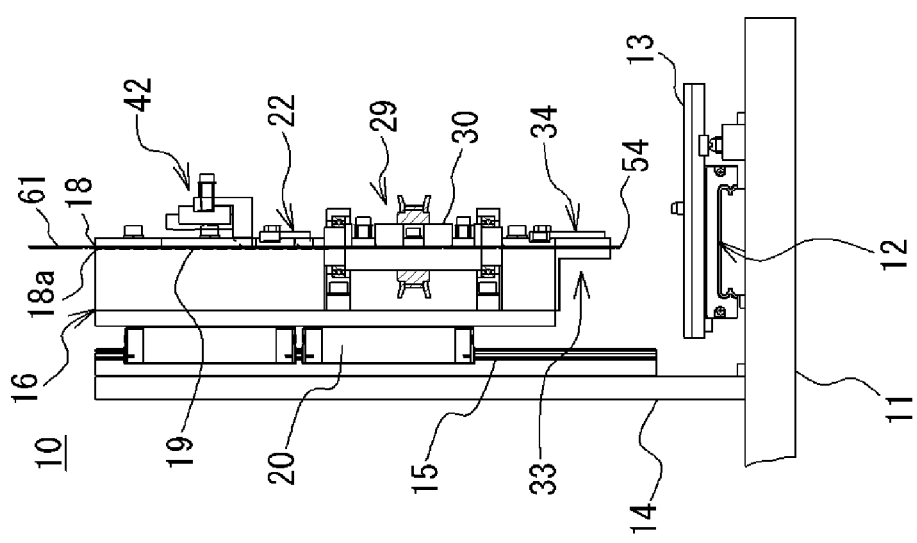

Thereafter, as shown in FIGS. 8C and 9C, the vertical operation section 16 moves upward by rotating the vertically movement cam 50 of the power unit 49. With this upward movement, the continuous PF terminal body 61 is fed downward by the fixed feeding means 42 with respect to the vertical operation section 16, i.e. the upward movement of the continuous PF terminal body 61 in response with the upward movement of the vertical operation section 16 is restricted by engaging the third pressing section 47 of the restraining claw section 46 of the fixed feeding means 42 with at least one shoulder section 59 formed on the continuous PF terminal body 61. Therefore, the continuous PF terminal body 61 is stationary with respect to the member other than the vertical operation section 16 e.g. the rear plate 14 but is fed downward with respect to the vertical operation section 16 which moves upward.

As for the movable feeding means 22 and the movable press-fitting means 34 of the mounting means 33 which move upward together with the vertical operation section 16, since the feeding claw section 26 and the press-fitting claw section 38 which are provided thereon are positioned within the insertion passage 19, it is necessary so as not to obstruct the downward feed of the continuous PF terminal body 61. Therefore, the movable feeding means 22 is configured so that the movable feeding means 22 moves apart from the insertion passage with the first attachment section 23 as the fulcrum. When the shoulder section 59 of the continuous PF terminal body 61 which is restricted abuts the first slant section 28 of the feeding claw section 26 during the vertical operation section 16 moving upward, the feeding claw section 26 moves from the inside of the insertion passage 19 since the movable feeding means 22 moves in the direction apart from the insertion passage 19 with the first attachment section 23 as the fulcrum, thereby the shoulder section 59 and the PF section 58 of the continuous PF terminal body 61 can be inserted through the insertion passage 19. Since the first slant section 28 is formed on the upper portion of the feeding claw section 26, the movement of the fixed feeding means 42 due to the abutment of the shoulder section 59 of the continuous PF terminal body 61 is smoothened.

Similarly, in the movable press-fitting means 34 of the mounting means 33, the movable press-fitting means 34 is configured so as to move apart from the insertion passage 19 with the second attachment section 35 as a fulcrum. Therefore, when the vertical operation section 16 moves upward, the shoulder section 59 of the PF terminal 54 which is restricted to move abuts the second slant section 40 of the press-fitting claw section 38, thus the movable press-fitting means 34 moves apart from the insertion passage 19 with the second attachment section 35 as the fulcrum. In this way, since the press-fitting claw section 38 inside the insertion passage 19 moves, thus the shoulder section 59 and the PF section 58 of the PF terminal 54 can be passed through the insertion passage 19. Since the second slant section 40 is formed on the upper portion of the press-fitting claw section 38, the movement of the fixed feeding means 42 due to the abutment of the shoulder section 59 of the continuous PF terminal body 61 is smoothened.

When the vertical operation section 16 returns to the uppermost position, the divided PF terminal 54 of the leading end is placed on the movable feeding means 22 of the mounting means 33 so as to be pressed by the continuous PF terminal body 61 which is restricted to move, and is prepared for the subsequent mounting process.

As described above, the one cycle of the process for mounting the PF terminal 54 is finished, and the mounting member installing structure 12 disposed on the base 11 subsequently moves in a predetermined distance and a predetermined direction to, thus the next mounting portion is arranged (refer to FIG. 8C). Repeating the above process, the PF terminals 54 can be repeatedly mounted onto the substrate. Further, by making use of the continuous PF terminal body in which the PF terminals are joined, handling come to be easier than the case in which the single PF terminals are mounted onto the member to be attached.

In order to place the PF terminal 54 in the mounting means 33 in the state that the PF terminal can be mounted as shown in FIGS. 8A and 9A, the vertical operation section 16 moves upward and downward in a plurality of times after the continuous PF terminal body 61 is fed from the feed port 18 into the insertion passage 19.

The invention claimed is:

1. A press-fitting device for mounting a press-fit terminal having a shoulder and a press-fit section to a member to be attached, the press-fitting device comprising:
    a base for mounting to the member to be attached;
    a rear plate perpendicularly disposed with respect to the base; and
    a vertical operation section attached to the rear plate so as to move upward and downward; wherein
    the vertical operation section is provided with:
    an insertion passage for allowing insertion of a continuous press-fit terminal body made up of a plurality of press-fit terminals serially formed on a wire material;
    at least one movable feeding means for feeding in one direction the continuous press-fit terminal body inserted inside the insertion passage;
    a dividing means for dividing the continuous press-fit terminal body into respective press-fit terminals; and
    a mounting means for mounting the divided press-fit terminals onto the member to be attached;
    the rear plate is provided with a fixed feeding means which is stationary fixed with respect to the vertical operation section and restricts the of the continuous press-fit terminal body in accordance with the upward movement of the vertical operation section,
    such that the press-fit terminal may be mounted onto the member to be attached by means of upward and downward movement of the vertical operation section, wherein
    the mounting means is provided with a movable press-fitting means, and the movable press-fitting means has:
    a second attachment section attached to a surface of a front face of the vertical operation section opposite to the rear plate of the vertical operation section;
    a second downward suspended section downwardly suspended from a central portion of the second attachment section; a second extended section extended from a lower side of the second downward suspended section toward the insertion passage; and
    a press-fitting claw section which is placed at both sides of the continuous press-fit terminal body inserted through the insertion passage, and at a distal end side of the second extended section and has a width being able to press the shoulder; and wherein
    when the vertical operation section moves downward, the shoulder of the press-fit terminal which is divided by the dividing means from the continuous press-fit terminal body can be pressed by a second pressing section of the press-fitting claw section of the distal end side of the second extended section, thus mounting the press-fit terminal onto the member to be attached.

2. The press-fitting device according to claim 1, wherein the movable press-fitting means is attached so as to be able to move apart from the front face of the vertical operation section with the second attachment section as a fulcrum;
    the feeding claw section press-fitting claw section is formed with a second slant section inclining toward the insertion passage at an upper opposing side of the second pressing section; and
    when the vertical operation section moves upward, since the shoulder of the press-fit terminal which is restricted to move upward together with the vertical operation section by the fixed feeding means abuts the second slant section of the press-fitting claw section and the movable press-fitting means moves in a direction apart from the insertion passage with the second attachment section as the fulcrum, the shoulder and the press-fit section of the press-fit terminal can be passed through the insertion passage.

3. A press-fitting device for mounting a press-fit terminal having a shoulder and a press-fit section to a member to be attached, the press-fitting device comprising:
    a base for mounting to the member to be attached;
    a rear plate perpendicularly disposed with respect to the base; and a vertical operation section attached to the rear plate so as to move upward and downward; wherein the vertical operation section is provided with:

an insertion passage for allowing insertion of a continuous press-fit terminal body made up of a plurality of press-fit terminals serially formed on a wire material:

at least one movable feeding means for feeding in one direction the continuous press-fit terminal body inserted inside the insertion passage:

a dividing means for dividing the continuous press-fit terminal body into respective press-fit terminals: and a mounting means for mounting the divided press-fit terminals onto the member to be attached:

the rear plate is provided with a fixed feeding means which is stationary fixed with respect to the vertical operation section and restricts the movement of the continuous press-fit terminal body in accordance with the upward movement of the vertical operation section, such that the press-fit terminal may be mounted onto the member to be attached by means of upward and downward movement of the vertical operation section, wherein the fixed feeding means has:

a support member which is attached to the rear plate and extended to a front face side opposite to the rear plate;

a third attachment section attached to the support member;

a third downward suspended section downwardly suspended from a central portion of the third attachment section;

a third extended section extended from a lower side of the third downward suspended section toward the insertion passage; and a restraining claw section placed at both sides of the continuous press-fit terminal body inserted through the insertion passage, and at a distal end side of the third extended section and has a width being able to press a shoulder section of the continuous press-fit terminal body; wherein when the vertical operation section moves upward, since at least one shoulder section formed on the continuous press-fit terminal body is engaged with a third pressing section of a lower end side of the restraining claw section, upward movement of the continuous press-fit terminal body together with the vertical operation section is restricted.

4. The press-fitting device according to claim 3, wherein the fixed feeding means is attached so as to be able to move apart from a front face of the vertical operation section with the third attachment section as a fulcrum;

the restraining claw section is formed with a third slant section inclining toward the insertion passage at an upper opposing side of the third pressing section; and when the vertical operation section moves upward, since the shoulder section of the continuous press-fit terminal body which is fed downward by the movable feeding means abuts the third slant section of the restraining claw section and the fixed feeding means moves in a direction apart from the insertion passage with the third attachment section as the fulcrum, the shoulder section and the press-fit section of the continuous press-fit terminal body can be passed therethrough.

5. A press-fitting device for mounting a press-fit terminal having a shoulder and a press-fit section to a member to be attached, the press-fitting device comprising:

a base for mounting to the member to be attached;

a rear plate perpendicularly disposed with respect to the base; and a vertical operation section attached to the rear plate so as to move upward and downward; wherein the vertical operation section is provided with:

an insertion passage for allowing insertion of a continuous press-fit terminal body made up of a plurality of press-fit terminals serially formed on a wire material;

at least one movable feeding means for feeding in one direction the continuous press-fit terminal body inserted inside the insertion passage;

a dividing means for dividing the continuous press-fit terminal body into respective press-fit terminals; and a mounting means for mounting the divided press-fit terminals onto the member to be attached;

the rear plate is provided with a fixed feeding means which is stationary fixed with respect to the vertical operation section and restricts the movement of the continuous press-fit terminal body in accordance with the upward movement of the vertical operation section, such that the press-fit terminal may be mounted onto the member to be attached by means of upward and downward movement of the vertical operation section, wherein the dividing means is provided with a twist cutting section rotatably disposed about an axis of the insertion passage; and after the press-fit terminal of a distal end side of the continuous press-fit terminal body which is just before dividing is introduced into the insertion passage of the vertical operation section at the twist cutting section, as the twist cutting section is rotated at a predetermined angle, the press-fit terminal is divided by rotation of the press-fit terminal of the distal end side with respect to the continuous press-fit terminal body, and subsequently to the dividing of the press-fit terminal by the rotation, the twist cutting section is returned to an original position by further one round of rotation or a rotating to a reverse direction.

* * * * *